United States Patent [19]

Okano et al.

[11] Patent Number: 4,887,224

[45] Date of Patent: Dec. 12, 1989

[54] IMAGE DATA PROCESSING APPARATUS CAPABLE OF HIGH-SPEED DATA ENCODING AND/OR DECODING

[75] Inventors: Tatsuo Okano, Yokohama; Katsutoshi Hisada, Tokyo, both of Japan

[73] Assignee: Canon Kabushiki Kaisha, Tokyo, Japan

[21] Appl. No.: 88,271

[22] Filed: Aug. 24, 1987

[30] Foreign Application Priority Data

Aug. 28, 1986 [JP] Japan .................. 61-202003
Aug. 28, 1986 [JP] Japan .................. 61-202004
Nov. 4, 1986 [JP] Japan .................. 61-262454
Nov. 5, 1986 [JP] Japan .................. 61-264363

[51] Int. Cl.[4] ............................. H04N 1/41
[52] U.S. Cl. ................... 364/518; 358/261.4; 358/426
[58] Field of Search ............ 364/200, 518, 521, 900; 340/798, 799, 800, 802, 803; 358/260, 261.2, 261.4, 280; 382/41, 56

[56] References Cited

U.S. PATENT DOCUMENTS

| | | | |
|---|---|---|---|
| 4,675,908 | 6/1987 | Saito et al. | 382/41 |
| 4,694,352 | 9/1987 | Ina et al. | 358/257 |
| 4,700,234 | 10/1987 | Nagashima | 358/260 |
| 4,706,127 | 11/1987 | Nobuta | 358/280 |
| 4,730,212 | 3/1988 | Wajcik et al. | 358/83 |
| 4,750,043 | 6/1988 | Hisada et al. | 358/261 |
| 4,775,893 | 10/1988 | Ishikawa | 358/261.1 |
| 4,799,110 | 1/1989 | Hisada et al. | 358/261.3 |

FOREIGN PATENT DOCUMENTS 3436631 4/1985 Fed. Rep. of Germany .
3523819 1/1986 Fed. Rep. of Germany .

*Primary Examiner*—A. D. Pellinen
*Assistant Examiner*—David Osborn
*Attorney, Agent, or Firm*—Fitzpatrick, Cella, Harper & Scinto

[57] ABSTRACT

An image data processing apparatus capable of high-speed encoding even for intermittently supplied image data is provided with a memory storing image data, an encoder for encoding the image data and/or a decoder for decoding such encoded information and a transfer unit for DMA transfer of the image data from the memory to the encoder. A supply circuit may be provided for supplying the encoder with the reference signals in synchronization with the DMA transfer of the image data by the transfer unit. The encoding and/or decoding are performed intermittently, e.g., in response to supply of the reference signals.

12 Claims, 15 Drawing Sheets

IMAGE DATA PROCESSING APPARATUS CAPABLE OF HIGH-SPEED DATA ENCODING AND/OR DECODING

BACKGROUND OF THE INVENTION

1. Field of the Invention

The present invention relates to an image data processing apparatus for electrically processing an image in a facsimile machine, a digital copying machine or the like.

2. Related Background Art

An encoding processing has been employed for compressing image data to avoid the redundancy thereof, for the purpose of improving the efficiency of transmission of image data, for example in a facsimile apparatus, or of storage of image data, for example in an image file.

There are already known various encoding processes, such as modified Huffman (MH) encoding, modified Read (MR) encoding or modified modified Read (MMR) encoding.

For example, a two-dimensional encoding, such as MMR encoding, relies on the correlation between an image line to be encoded and a preceding image line. Such correlation is in most cases identified by software of a microcomputer, and the data fetch timing of the encoding unit is also controlled by a microcomputer. In addition the decoding of thus encoded data is usually achieved by a software process of a microcomputer, and the output timing of thus decoded image data is also controlled by a microcomputer.

Consequently the encoding and decoding operations are governed by the processing speed of the microcomputer, so that a high-speed encoding or decoding operation has been difficult to achieve. Although it is possible to achieve a high-speed process through the use of encoding or decoding hardware, not relying on a microcomputer, such circuitry cannot be applied to image data supplied intermittently, for example by DMA transmission, since the interruption or re-start of an encoding or decoding operation is difficult to achieve in such a circuit.

The use of an image memory, for storing image data, is already known in the apparatus for electrically processing image data, such as a facsimile apparatus or a digital copying machine.

Such image memory is composed for example of a random access semiconductor memory, but is unable to effect image storing operation and image reading operation at the same time.

Therefore, in a case where an image storing operation and an image reading operation are requested simultaneously these operations are executed alternately or a priority is given to one or the other operation, but these methods lack flexibility as a system.

Also, data storage into the image memory and data reading therefrom are conducted in units of a predetermined amount of data. Consequently, if it is desired to perform data storage or reading in units of a word or a byte, there will be required a conversion from a word to a byte, with additional component parts.

SUMMARY OF THE INVENTION

In consideration of the foregoing, an object of the present invention is to provide an image data processing apparatus capable of efficient image data processing with a high speed.

Another object of the present invention is to provide an image data processing apparatus capable of efficient and high-speed encoding of image data, even for data supplied intermittently.

Still another object of the present invention is to provide an image data processing apparatus capable of supplying decoded image data at a high speed, even on an intermittent basis.

Still another object of the present invention is to provide an image processing apparatus capable of image memory control efficiently responding to simultaneous requests for data storage into and data reading from the image memory.

Still another object of the present invention is to enable an image memory circuit to effect a storing or reading operation in units of various data amounts, for example in units of a word and a byte.

Still another object of the present invention is to provide an image processing apparatus adapted for use in a facsimile apparatus provided with encoding and decoding functions.

According to the present invention, the foregoing objects are attained by provision of an image data encoding apparatus, or an image code decoding apparatus, having, respectively, encoding means for encoding image data, or decoding means for decoding an image code and generating image data corresponding thereto. The encoding apparatus has a memory means for storing a page of image data to be encoded. The decoding apparatus has a memory means for storing image data generated by the decoding means. Both apparatus have a transfer means for DMA transfer of image data between the encoding or decoding means, respectively, and the memory means. The transfer means is operable for intermittent DMA transfer of a page of image data in units of a predetermined amount. Both apparatus also include a control means for causing the encoding or the decoding means, respectively, intermittently to perform encoding of the image data, or decoding of the image code, respectively, in synchronization with the intermittent DMA transfer by the transfer means.

The DMA transfer may be performed in parallel, and converter means may be provided to perform appropriate serial-to-parallel and/or parallel-to-serial conversion. The encoding and decoding operations may be performed in response to supply of a reference signal, for example, being performed only as long as such reference signal is supplied.

The foregoing and still other objects and features of the present invention, and the advantages thereof, will become fully apparent from the following description.

DETAILED DESCRIPTION OF THE PREFERRED EMBODIMENTS

Now the present invention will be clarified in detail by description of the preferred embodiments thereof, shown in the attached drawings. In the following there will be explained an embodiment in which the present invention is applied to two-dimensional MMR encoding of image data.

Figure 1:
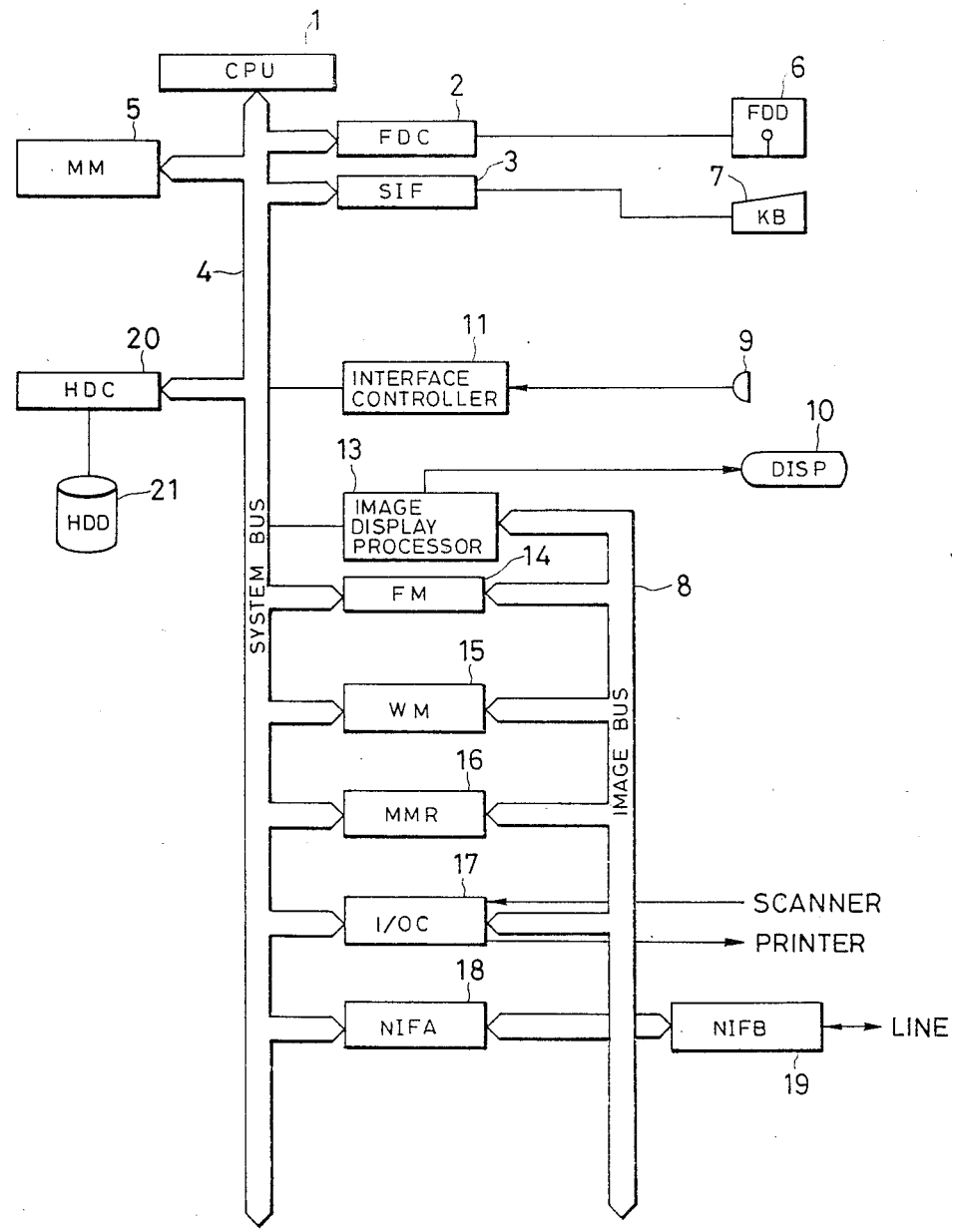
FIG. 1 is a block diagram of the structure of a facsimile apparatus embodying the present invention.

FIG. 1 is a block diagram showing the entire structure of a facsimile apparatus embodying the present invention. In FIG. 1 there are shown a CPU 1 composed of a known microprocessor; a floppy disk controller 2; a serial interface 3; a system bus 4; a main memory 5 storing the program of the CPU; a floppy disk driver 6 for floppy disks storing user programs or the like; a keyboard 7 for entering commands; an image bus 8; a pointing device 9; a display unit 10; an interface controller 11; an image display processor 13; a frame memory 14; a window memory 15; an MMR encoder/decoder 16; an I/O controller 17; a line interface-A 18; a line interface-B 19; a rigid disk controller 20; and a rigid disk driver 21.

The line interface-B 19 for effecting data transmission/reception process with the line receives MMR encoded data in succession from the line, then informs the line interface-A 18 of the reception of said MMR encoded data and transfer said data to said line interface-A 18. In response the line interface-A 18 informs the CPU 1 of the reception of the MMR encoded data by inter-CPU communication through the system bus 4, and fetches the data transferred from the line interface-B 19. Upon completion of reception of the MMR encoded data from the line and of the fetching of the data transferred from the line interface-B 19, the line interface-A 18 informs the CPU 1 of this facet. In response the CPU 1 transfers the received data from the line interface-A 18 to the rigid disk driver 21 through the system bus 4 and the rigid disk controller 20 and stores the received data in the rigid disk.

The MMR encoded data received from the line and stored in the rigid disk driver 21 are decoded and supplied to the printer in the following manner.

The CPU 1 transfers the MMR encoded data, stored in the rigid disk driver 21, to the window memory 15 through the rigid disk controller 20. Then the CPU 1 supplies the MMR encoder/decoder 16 with a decoding request command through inter-CPU communication. In response, the MMR encoder/decoder 16 receives the MMR encoded data in succession, in units of one word in parallel manner, by DMA transfer from an area of the window memory 15 designated by the CPU 1. The MMR encoder/decoder for each data unit 16 executes decoding for each data unit in succession, and the decoded image data are sent, in parallel manner by DMA transfer in units of one word, to an area of the frame memory 14 designated by the CPU 1, through the image bus 8.

After the completion of decoding for the data of the entire area of the window memory designated by the CPU 1 and of the storage of decoded data in the frame memory 14, the MMR encoder/decoder 16 sends a response, indicating the completion of decoding, to the CPU 1. Upon reception of said response, the CPU 1 supplies the I/O controller 17 with a command requesting an output to the printer, and the I/O controller 17 supplies the printer with the decoded image data by reading said data from an area of the frame memory 14 designated by the CPU 1 and transferring said data through the image bus 8. In response the printer records, on a recording material such as paper, an image corresponding to the received image data. Also, in a case of signal output on the display unit 10, the image data stored in the window memory 15 are decoded and transferred to the frame memory 14, and the image display processor 13 makes access to said frame memory 14 to display an image corresponding to the received image data on the display unit 10.

The MMR encoded data received from the communication line are supplied to the printer or the display unit 10 in the above-explained manner. In the following there will be explained the procedure of encoding image data read by a scanner and transmitting said data to the line.

At first the scanner sends a start signal, requesting the start of a reading operation, to the I/O controller 17, which transfers said signal to the CPU 1. In response the CPU 1 instructs the I/O controller 17 to start the reading operation of the scanner. Thus the I/O controller 17 causes the scanner to start the reading operation, and stores the image data, obtained in the scanner by reading an original image, in succession in an area of the window memory designated by the CPU 1, through the image bus 8. Upon completion of the reading operation in the scanner, the I/O controller 17 informs the CPU 1 of said completion. In response the CPU 1 transfers, in succession, the image data stored in the window memory 15 to the rigid disk driver 21 through the system bus 4 and the rigid disk controller 20.

The image data thus stored in the rigid disk driver 21 are MMR encoded in the following manner.

The CPU 1 transfer the image data stored in the rigid disk driver 21 to the frame memory 14. Upon completion of said transfer, the CPU 1 sends an encoding request command to the MMR encoder/decoder 16, which, in response, receives the image data, in parallel manner by DMA transfer in units of a word, from the frame memory 14 designated by the CPU 1, through the image bus 8. The MMR encoder/decoder 16 effects the MMR encoding of said image data in succession, and the MMR encode data are stored, through the system bus, in an area of the window memory 15 designated by the CPU 1.

Upon completion of the MMR encoding on all the data in the frame memory 14 designated by the CPU 1, the MMR encoder/decoder 16 sends a response, indicating the completion of encoding, to the CPU 1, which, in response, stores the MMR encoded data of the window memory 15 into the rigid disk driver 21 through the system bus 4 and the rigid disk controller 20.

Then the CPU 1 transfers the MMR encoded data, thus stored in the rigid disk driver 21, to the line interface-A 18 through the rigid disk controller 20 and the system bus 4. At the same time the CPU 1 informs the line interface-A 18 of the transmission, and the line interface-A 18 requests the line interface-B 19 to execute a transmission process. In response to said request, the line interface-B 19 receives the NMR encoded data to be transmitted from the line interface-A 18 and executes the transmission process of transmitting the data units onto the line.

Figure 2:
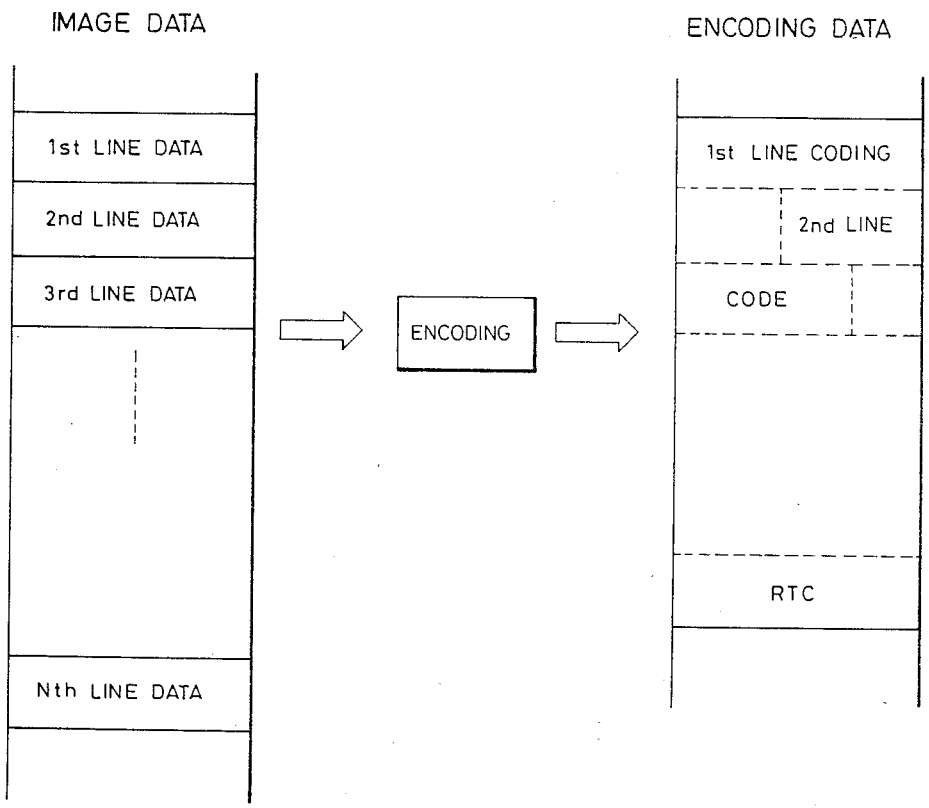
FIG. 2 is a schematic view of the encoding operation for image data.

FIG. 2 shows the mode of MMR encoding the image data stored in the frame memory, one scanning line at a time, by the MMR encoder/decoder 16 shown in FIG. 1.

Figure 3:
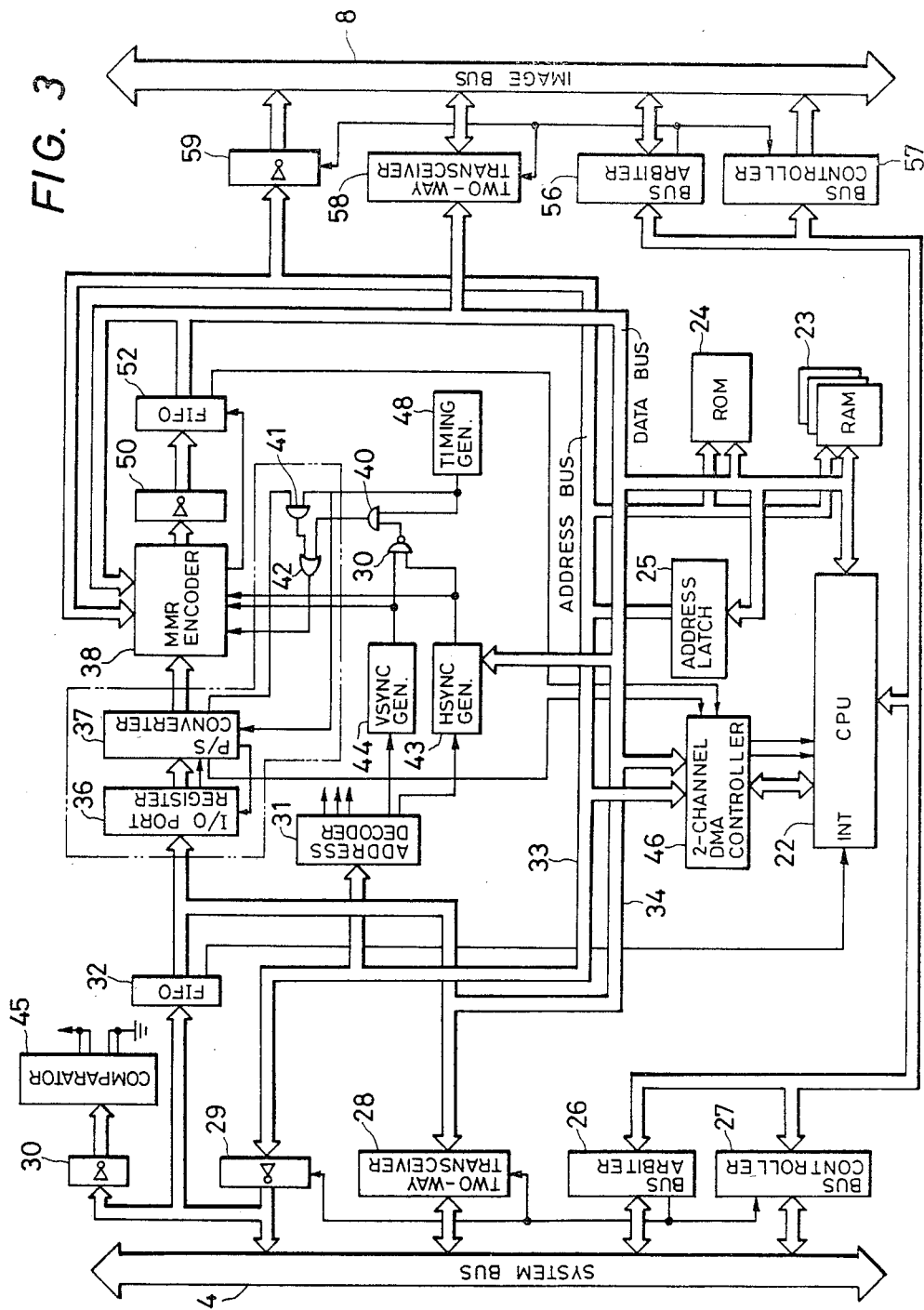
FIG. 3 is a block diagram showing an example of an MMR encoding apparatus.

FIG. 3 is a block diagram showing an example of an encoder in the MMR encoder/decoder 16 shown in FIG. 1.

In FIG. 3 there are shown a CPU 22; a RAM 23; a ROM 24; an address latch 25; bus arbiters 26, 56; bus controllers 27, 57; bidirectional transceivers 28, 58; tristate buffers 29, 59; buffers 30, 50; an address decoder 31; FIFO registers 32, 52; an address bus 33; a data bus 34; an I/O port register 36; a P/S converter 37; an MMR encoder 38; a NAND gate 39; AND gates 40, 41; an OR gate 42; a horizontal synchronization signal generator 43; a vertical synchronization signal generator 44; a comparator 45; a 2-channel DMA controller 46; and a timing signal generator 48.

Figure 6:
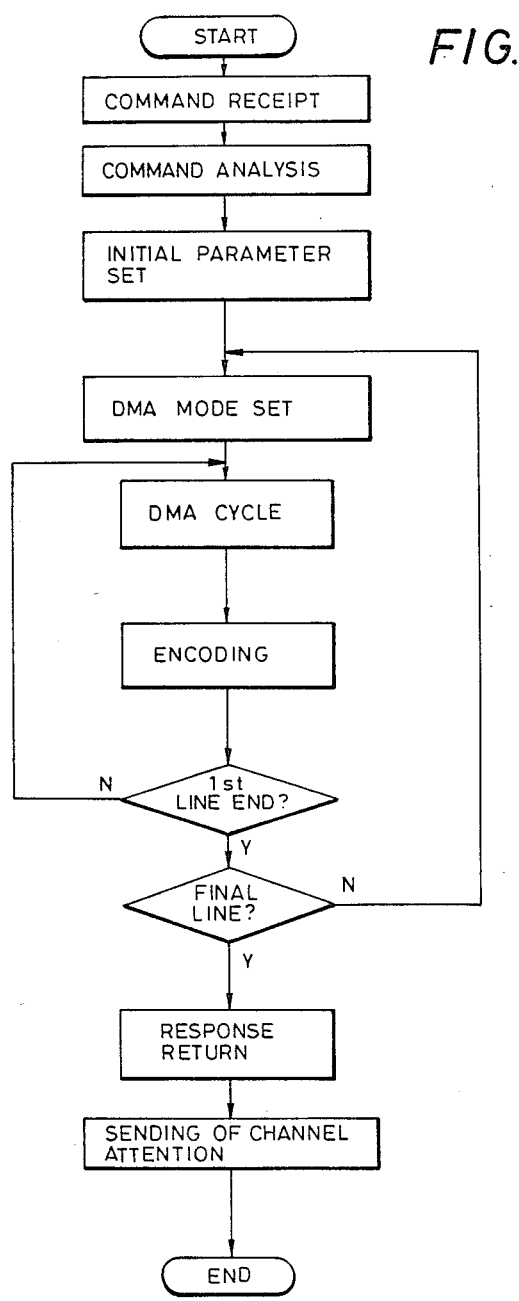
FIG. 6 is a flow chart showing a control sequence of encoding operation.

In the following there will be explained the function of the circuit shown in FIG. 3. The control sequence of the CPU 22 is shown in FIG. 6.

A channel attention signal indicating the presence or absence of a command is supplied from the CPU 1 shown in FIG. 1, through the system bus 4. Said channel attention signal is an I/O address composed of a channel command code and a CPU number, and indicates the presence of a command to a CPU at the destination of the transmission. Said channel attention signal is supplied, through the buffer 30, to the comparator 45 which compares said signal with the CPU number of this unit, and, if said signal is discriminated as being addressed to the CPU of this machine, the FIFO register 32 fetches the number of the CPU which generated said channel attention signal. At the same time the FIFO register 32 sends an interruption signal to the CPU 22, which in response reads said CPU number from the FIFO register 32.

After the confirmation of the CPU number, the CPU 22 activates the DMA controller 46 to send an address signal to the address bus 33. Simultaneously the CPU 22 requests acquisition of the system bus 4 of the bus arbiter 26, and, upon said acquisition, informs the bus controller 27 of said acquisition. Thus the bus controller 27 exchanges memory control signals with the system bus 4. The bus arbiter 26 informs the bidirectional transceiver 28 and the tristate buffer 29 of said bus acquisition. The tristate buffer 29 sends an address signal to the system bus 4. Also the command is read, through said bidirectional transceiver 28, from an inter-CPU communication area in the frame memory 14 shown in FIG. 1.

Figure 4:
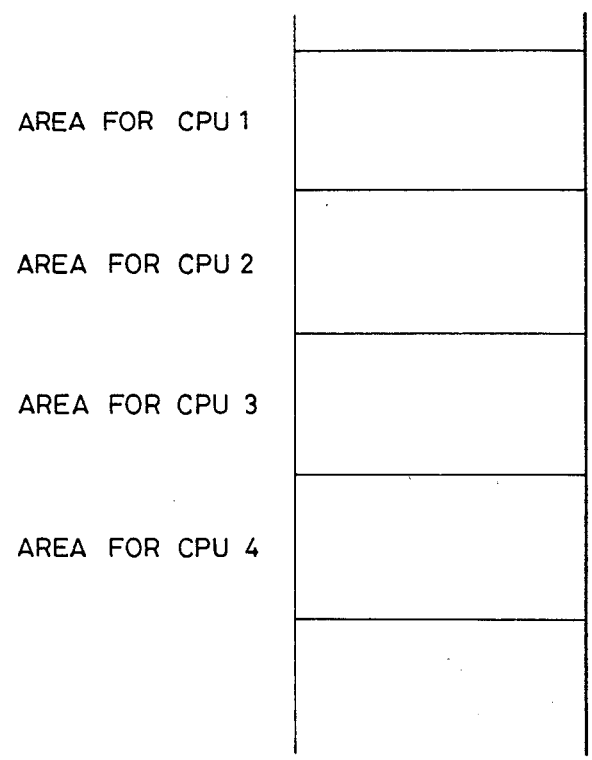
FIG. 4 is a view of memory areas for communication among CPU's.

FIG. 4 illustrates the inter-CPU communication area provided in the frame memory 14.

The command read from said area is stored in the RAM 23 through the system bus 4 and the bidirectional transceiver 28. The CPU 14 analyzes the command stored in the RAM 23. Upon identifying an encoding request command, it sets, in the 2-channel DMA controller 46, an address of the image data area of the frame memory 14 attached to said command, and also sets, in the 2-channel DMA controller 46, an address of the MMR encoded data in the window memory, attached to said command. Besides the CPU 22 activates the address decoder 31 and sets the number of bits per scanning line, attached to said command, in the horizontal synchronization signal generator 43 and the MMR encoder 38, by means of an address decoding signal.

Figure 5:
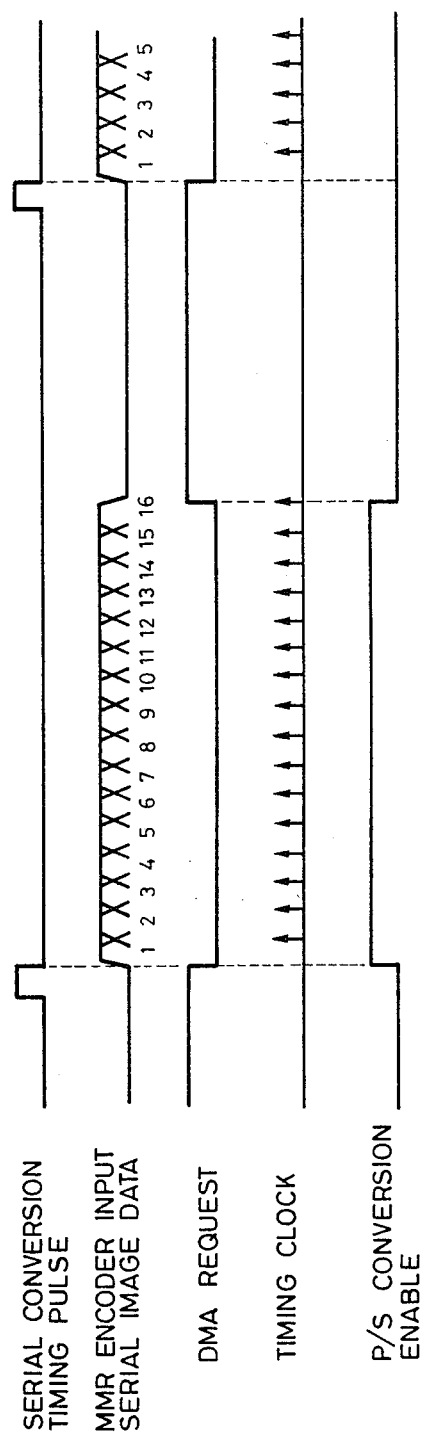
FIG. 5 is a timing chart showing a serial conversion of image data.

In the following explained is the actual encoding operation for image data, with reference to FIG. 5 showing a timing chart of the operations relating to encoding. The MMR encoder 38 receives a timing clock signal from the timing signal generator 48, through the AND gate 40 and the OR gate 42. Said encoder 38 effects the encoding operation when the timing clock signal is supplied, but interrupts said encoding operation when the supply of the timing clock signal is interrupted.

Then the CPU 22 activates the address decoder 31, and requests, by the address decoding signal generated at said activation, the vertical synchronization signal generator 44 to generate a vertical synchronization signal. In response said generator 44 generates a vertical synchronization signal representing the image data input period of a frame, and informs the MMR encoder 38 and the NAND gate 39 of said signal generation. Similarly the CPU 22 activates the address decoder 31, and requests generation of a horizontal synchronization signal by the horizontal synchronization signal generator 43, which generates a horizontal synchronization signal representing the image data input period of a scanning line and informs the MMR encoder 38 and the NAND gate 39 of said signal generation. In this state the output of the NAND gate 39 terminates the supply of the timing signal from the timing generator 48 to the MMR encoder 38 through the AND gate 40 and the OR gate 42. Consequently the MMR encoder 38 interrupts the encoding operation.

In the above-explained state, the CPU 22 instructs the DMA controller 46 to start a DMA cycle. In response to a DMA request signal from the P/S converter 37, the DMA controller 46 releases in a DMA cycle. At the same time the CPU 22 requests the bus arbiter 56 to acquire the image bus 8, and, upon said acquisition, informs the bus controller 57 of said acquisition. Thus the bus controller 57 exchanges memory control signals with the image bus 8. The bus arbiter 56 also informs the bidirectional transceiver 58 and the tristate buffer 59 of said bus acquisition.

Subsequently the tristate buffer 59 sends the address signal, previously set by the DMA controller 46, to the image bus 8. In response the DMA controller 46 reads the image in the unit of a word from the image data area of the frame memory shown in FIG. 1, through the image bus 8 and the bidirectional transceiver 58. The image data of a word read by the DMA controller 46 are latched in the I/O port register 36 in a next DMA write cycle, and simultaneously the image data in said I/O port register 36 are transferred to the P/S converter 37. At this timing the P/S converter 37 sends a clock enable signal to the AND gate 41, whereby the timing clock signal is supplied to the MMR encoder 38 as shown in FIG. 5, through the AND gate 41 and the OR gate 42. Also a serial conversion timing pulse is supplied from the I/O port register 36 to the P/S converter 37 as shown in FIG. 5.

Thus the data of the I/O port register 36 are loaded in the P/S converter 37, and a P/S conversion enable signal is supplied from the I/O port register 36 to the P/S converter 37 as shown in FIG. 5. In response the P/S converter executes parallel-serial conversion of the image data, and the converted serial image data are supplied to the MMR encoder 38 as shown in FIG. 5, in the form of 16-bit serial data. After the parallel-serial conversion of a word, the P/S converter 37 turns off the clock enable signal to the AND gate 40, whereby the supply of the timing clock signal to the MMR encoder 38 through the AND gate 41 and the OR gate 42 is interrupted. Then a DMA request signal is supplied to the DMA controller 46, requesting the DMA transfer of the image data to be encoded to the I/O port register 30.

As explained in the foregoing, the DMA transfer of the image data of a scanning line is conducted in units of a word, and the parallel-serial conversion is conducted in synchronization of the DMA transfer of each word, and the serially converted data are supplied to the MMR encoder 38. Upon completion of entry of the image data of a scanning line into the MMR encoder 38, the horizontal synchronization signal is terminated, whereby the timing clock signal is supplied through the AND gate 40 and the OR gate 42 to the MMR encoder 38, which thus encodes thus entered image data according to an already known MMR encoding process. The MMR encoding is explained in detail in U.S. patent application Ser. No. 888,493 of the assignee of the present invention; now U.S. Pat. No. 4,799,110, issued 1/89.

The MMR encoded data released from the MMR encoder 38 are supplied to the FIFO register 52 according to timing pulses released by the MMR encoder 38. In response to the entry of the MMR encoded data into the FIFO register 52, a DMA request signal is supplied to the DMA controller 46. In comparison with the DMA request signal from the P/S converter 37 for requesting the fetching of the image to be encoded, the DMA request signal from the FIFO register 52 has a higher priority. Therefore, in response to the DMA request signal from the FIFO register 52 as shown in FIG. 5, the DMA controller 46 starts a DMA read cycle for reading the MMR encoded data from the FIFO register 52, and, in a DMA write cycle, the MMR encoded data are supplied to the system bus 4 through the bidirectional transceiver 28, in a similar manner as in the image bus 8, by means of control signals of the bus arbiter 26 and the bus controller 27. Said data supplied to the system bus 4 are stored in an address area previously set in the window memory 15 shown in FIG. 1.

In response to the DMA transfer of the image data of a scanning line to the window memory 15, an interruption signal is supplied to the CPU 22, whereby the CPU 22 sets the DMA parameters (memory address, etc.) for a second scanning line in the DMA controller 46 and re-activates said DMA controller 46. The MMR encoded data obtained by encoding operation are stored in succession in the window memory 15 shown in FIG. 1.

When the image data of all the scanning lines are MMR encoded by repeating the encoding of image data of each scanning line, the CPU 22 writes a response in the RAM 23 and effects the DMA transfer of the content of said response, by the DMA controller 46, to an inter-CPU communication are provided in the frame memory 14 shown in FIG. 1.

Also a channel attention signal is supplied through the system bus 4 to the CPU 1 shown in FIG. 1, and the MMR encoding operation is thus completed.

Although the foregoing embodiment has been explained by MMR encoding, the present invention is applicable also to other encoding processes such as modified READ (MR) encoding or modified Huffman (MH) encoding.

As explained in the foregoing, the image data to be encoded are supplied to the encoder at a high speed in parallel DMA transfer, and the parallel-serial conversion of the image data and the encoding operation are executed in synchronization with said DMA transfers, so that a flexibility is ensured in the system designing and the high-speed encoding is rendered possible.

Figure 7:
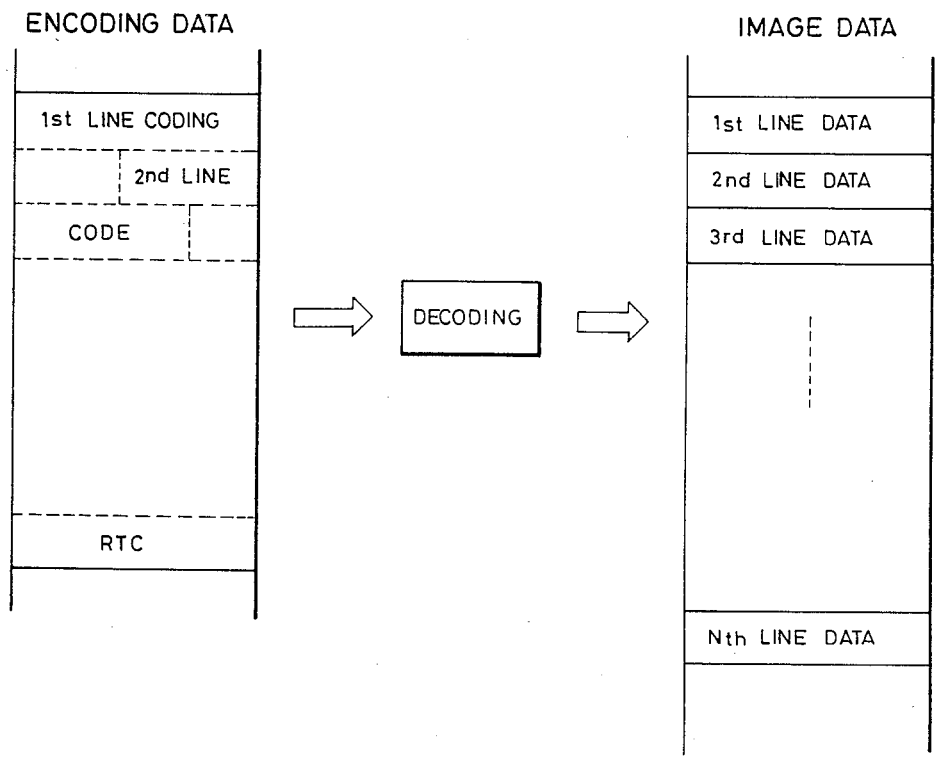
FIG. 7 is a schematic view of the decoding operation for image data.
Figure 8:
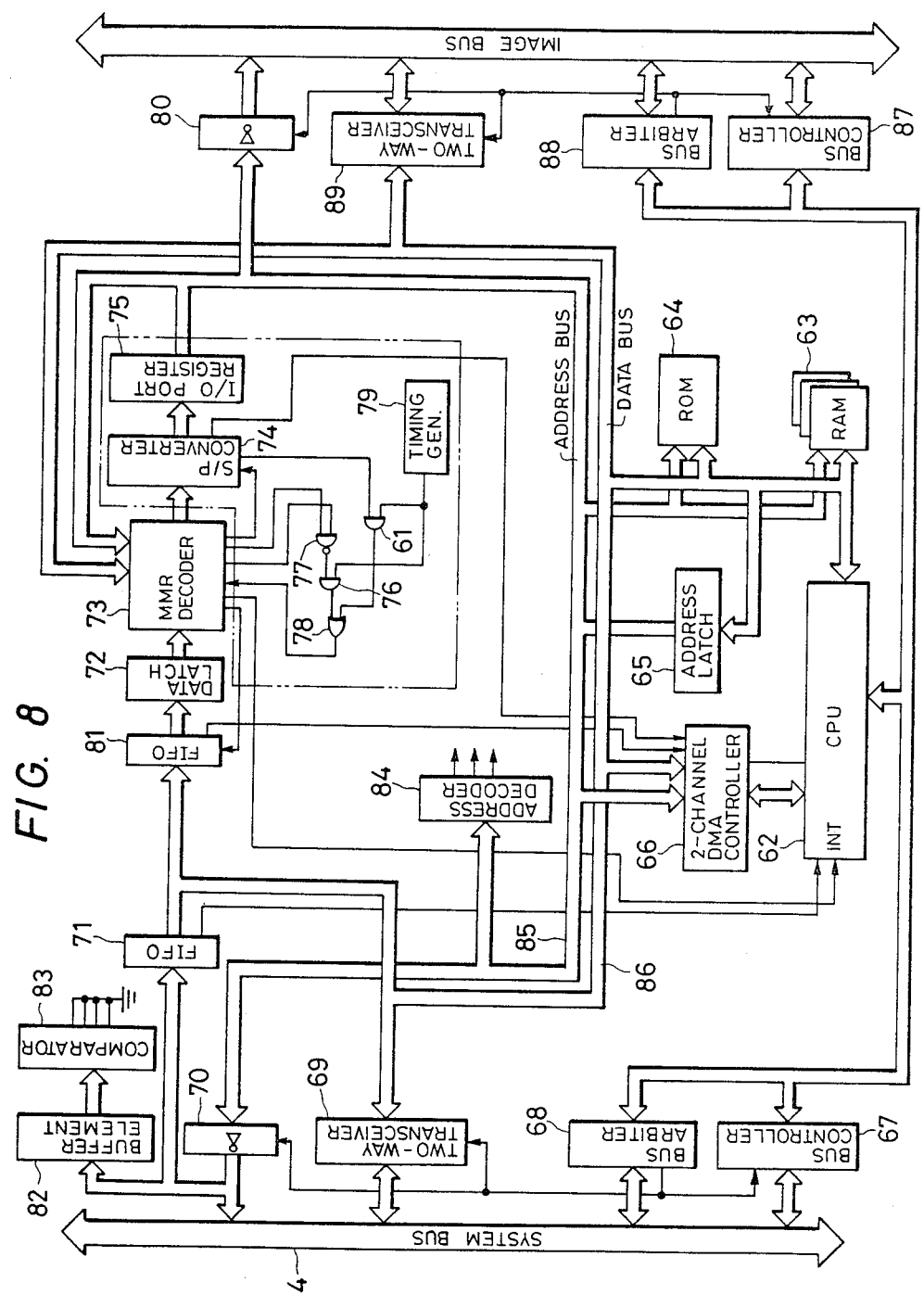
FIG. 8 is a block diagram showing an example of an MMR decoding apparatus.

FIG. 7 shows the mode of decoding the MMR encoded data stored in the window memory 15 shown in FIG. 1 and storing thus obtained image data of each scanning line in the frame memory 14. FIG. 8 is a block diagram of an example of the decoder of the MMR encoder/decoder 16 shown in FIG. 1. In FIG. 8 there are shown a CPU 62; a RAM 63, a ROM 64; an address latch 65; a 2-channel DMA controller 66; bus controller 67, 87; bus arbiters 68, 88; bidirectional transceivers 69, 89; tristate buffers 70, 80; FIFO registers 71, 81; a data latch 72; an MMR decoder 73; an S/P converter 74; an I/O port register 75; AND gates 76, 61; a NAND gate 77; an OR gate 78; a timing signal generator 79; an address decoder 84; a buffer 82; and a comparator 83.

Figure 10:
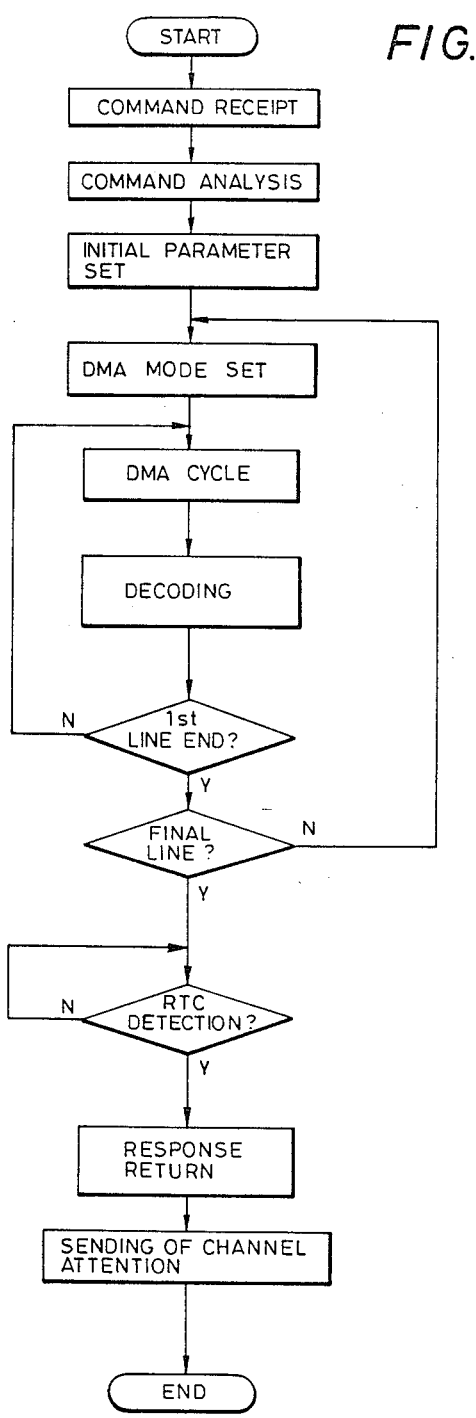
FIG. 10 is a flow chart showing the control sequence of a decoding operation.

In the following there will be explained the function of the circuit shown in FIG. 8, while making reference to a flow chart in FIG. 10, showing the control sequence.

A channel attention signal, indicating the presence or absence of a command, is supplied from the CPU 1 shown in FIG. 1, through the system bus 4. Said channel attention signal is an I/O address composed of a channel command code and a CPU number, and indicates the presence of a command to a CPU of the machine of the destination of the transmission. Said channel attention signal is supplied, through the buffer 82, to the comparator 83 which compares said signal with the number of CPU of this unit, and, if said signal is discriminated as being addressed to said CPU, the FIFO register 71 fetches the number of CPU which has generated said channel attention signal. At the same time the FIFO register 71 sends an interruption signal to the CPU 62, which in response reads said CPU number from the FIFO register 71.

After the confirmation of the CPU number, the CPU 62 activates the DMA controller 66 to send an address signal to the address bus 85. Simultaneously the CPU 62 requests the bus arbiter 68 to acquire the system bus, and, upon said acquisition, the bus arbiter 68 informs the bus controller 67 of said bus acquisition. Thus the bus controller 67 exchanges memory control signals with the system bus 4. The bus arbiter 68 also informs the bidirectional transceiver 69 and the tristate buffer 70 of said bus acquisition. The tristate buffer 69 sends an address signal to the system bus 4. Also the command is read, through said bidirectional transceiver 69, from an inter-CPU communication area in the frame memory 14 shown in FIG. 1.

The command read from said area is stored in the RAM 63 through the system bus 4 and the bidirectional transceiver 69. The CPU 62 and analyzes the command stored in the RAM 63. Upon identifying a decoding request command, it sets, in the 2-channel DMA controller 66, a memory address of the MMR encoded data of the window memory 15 attached to said command, and also sets, in the 2-channel DMA controller 66, an address of the image data area of the frame memory 14. In addition, the CPU 62 activates the address decoder 84 and sets the number of bits per scanning line, attached to said command, in the MMR decoder 73 by an address decoding signal.

The MMR decoder 73 receives a timing clock signal from the timing signal generator 79, through the AND gate 76 and the OR gate 78. Said decoder 73 effects the decoding operation when the timing clock signal is supplied, but interrupts said decoding operation when the supply of the timing clock signal is interrupted.

The CPU 62 effects DMA transfer of the MMR encoded data from the window memory 15, through the system bus 4 and the bidirectional transceiver 69, to the FIFO register 71 corresponding to the depth thereof. Said DMA transfer is conducted, when the FIFO register 81 has an area available for storing the MMR encoded data, according to a DMA request signal from the FIFO register 81 to the DMA controller 66. In this operation, the procedure of access to the bus controller 67, bus arbiter 68, bidirectional transceiver 69 and tristate buffer 70 is the same as that for command reading explained above.

Then the CPU 62 requests the MMR decoder 73 to start decoding.

Figure 9:
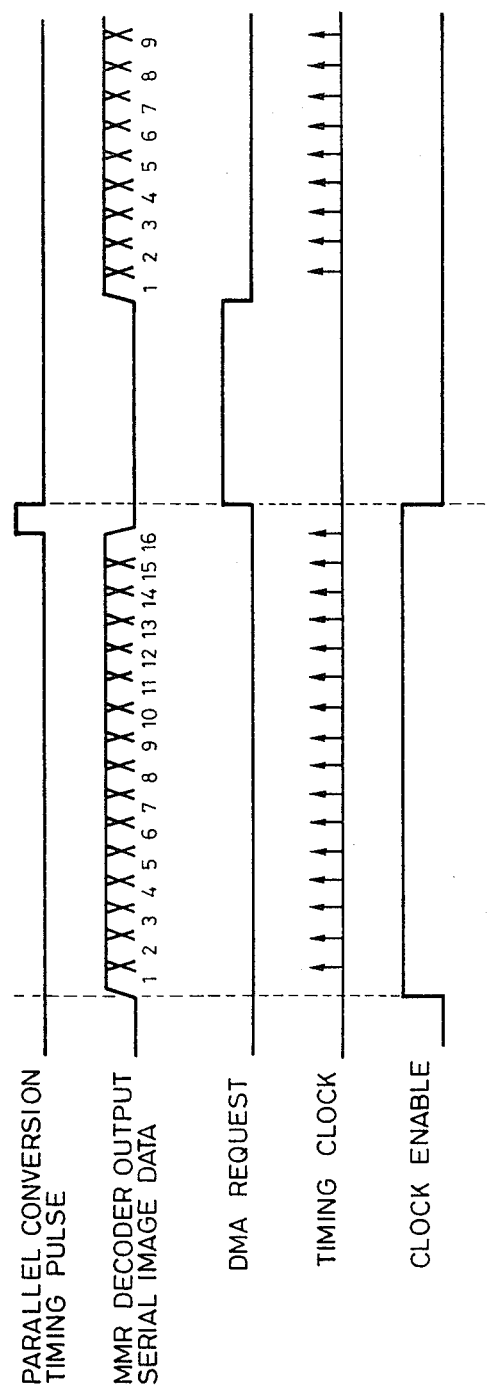
FIG. 9 is a timing chart showing parallel conversion of image data.

In the following there will be explained the actual decoding operation for decoding the MMR encoded data, with reference to FIG. 9, showing a timing chart relating to the decoding operation. First, the MMR decoder 73 releases a vertical synchronization signal indicating the input period of image data of a frame, and a horizontal synchronization signal indicating the input period of image data of a scanning line. At the same time the output signal of the NAND gate 77 terminates the supply of a timing clock signal which has been supplied from the timing clock generator 39 through the AND gate 76 and the OR gate 78, and a clock enable signal released from the S/P converter 74 initiates the supply of a timing clock signal from the timing signal generator 39 to the MMR decoder 73 through the AND gate 61 and the OR gate 78.

In this state the CPU 62 instructs the 2-channel DMA controller 6 to start a DMA cycle. Then, in response to a DMA request signal from the FIFO register 81, the 2-channel DMA controller 66 releases an address signal in a DMA read cycle, and the CPU 62 simultaneously requests the bus arbiter 68 to acquire the system bus 4. Thereafter the access to the system bus 4 is made in a similar manner to that explained above. Thus the received MMR encoded data are decoded by the MMR decoder 73 according to the timing clock signal. The process of decoding of MMR encoded rate is explained in detail in U.S. patent application Ser. No. 892,114 of the assignee of the present invention; now U.S. Pat. No. 4,750,043 issued 6/88.

The decoded serial image data, released from the MMR decoder 73 in synchronization with the timing clock signal as shown in FIG. 9, are converted, by the S/P converter 74, into a parallel word image, in units of words. Upon completion of conversion of a word, the clock enable signal released from the S/P converter 74 is turned off, whereby the supply of the timing clock signal to the MMR decoder 73 through the AND gate 61 and the OR gate 78 is terminated to interrupt the decoding operation. The word data of the S/P converter 74 are transferred to the I/O port register 75 by timing pulses shown in FIG. 9, supplied from said S/P converter 74.

Simultaneously the S/P converter 74 sends a DMA request signal to the 2-channel DMA controller 66. Said DMA request signal has a higher priority in comparison with the DMA request signal from the FIFO register 81, requesting the transfer of the MMR encoded data to the FIFO register 81. Thus the 2-channel DMA controller 66 starts a DMA cycle, reads word image data from the I/O port register 75 in a DMA read cycle, and requests the bus arbiter 88 to acquire the image bus 8 in a next DMA cycle. Upon said bus acquisition, the bus arbiter 88 informs the bus controller 87, bidirectional transceiver 89 and tristate buffer 80 of said acquisition. Thus the bus controller 87 exchanges memory control signals with the image bus 8. The tristate buffer 80 sends an address signal to the image bus 8, and the bidirectional transceiver 89 sends the word image data from the I/O port register 75 to the image bus 8. The image data thus sent are stored in the frame memory 14 shown in FIG. 1.

After the MMR encoded data corresponding to a scanning line are decoded and after the word image data of a scanning line converted in the S/P converter 74 are read from the I/O port register 75, the 2-channel DMA controller 66 sends an interruption signal to the CPU 62, which, in response, sets the DMA parameters (memory address, etc.) for a second scanning line in the 2-channel DMA controller 66 and activates said controller 66.

Thereafter the MMR encoded data are decoded in a similar manner. When all the data are fetched through the FIFO register 81 and the data latch 72 into the MMR decoder 73 and decoded therein, and upon detection of a RTC signal, indicating the end of a frame by the MMR decoder 73, corresponding information is sent to the CPU 62, which, thus knowing of the end of decoding, writes a response in the RAM 63 and executes a DMA transfer of the content of said response by the 2-channel DMA controller 66 to an inter-CPU communication area provided in the frame memory 14 as shown in FIG. 4.

Then a channel attention signal is given to the CPU 1, shown in FIG. 1, through the system bus 4, and the MMR decoding operation is thus terminated.

Although the foregoing embodiment has been explained by reference to the decoding of MMR encoded data, the present invention is applicable also to the decoding of data encoded by modified READ (MR) encoding or modified Huffman (MH) encoding.

As explained in the foregoing, the data to be decoded are sent by DMA transfer process and the decoder is operated in synchronization with said DMA transfers, so that a flexibility is ensured in the system designing and a high-speed decoding is rendered possible.

In the following there will be explained the window memory 15 shown in FIG. 1.

Figure 11:
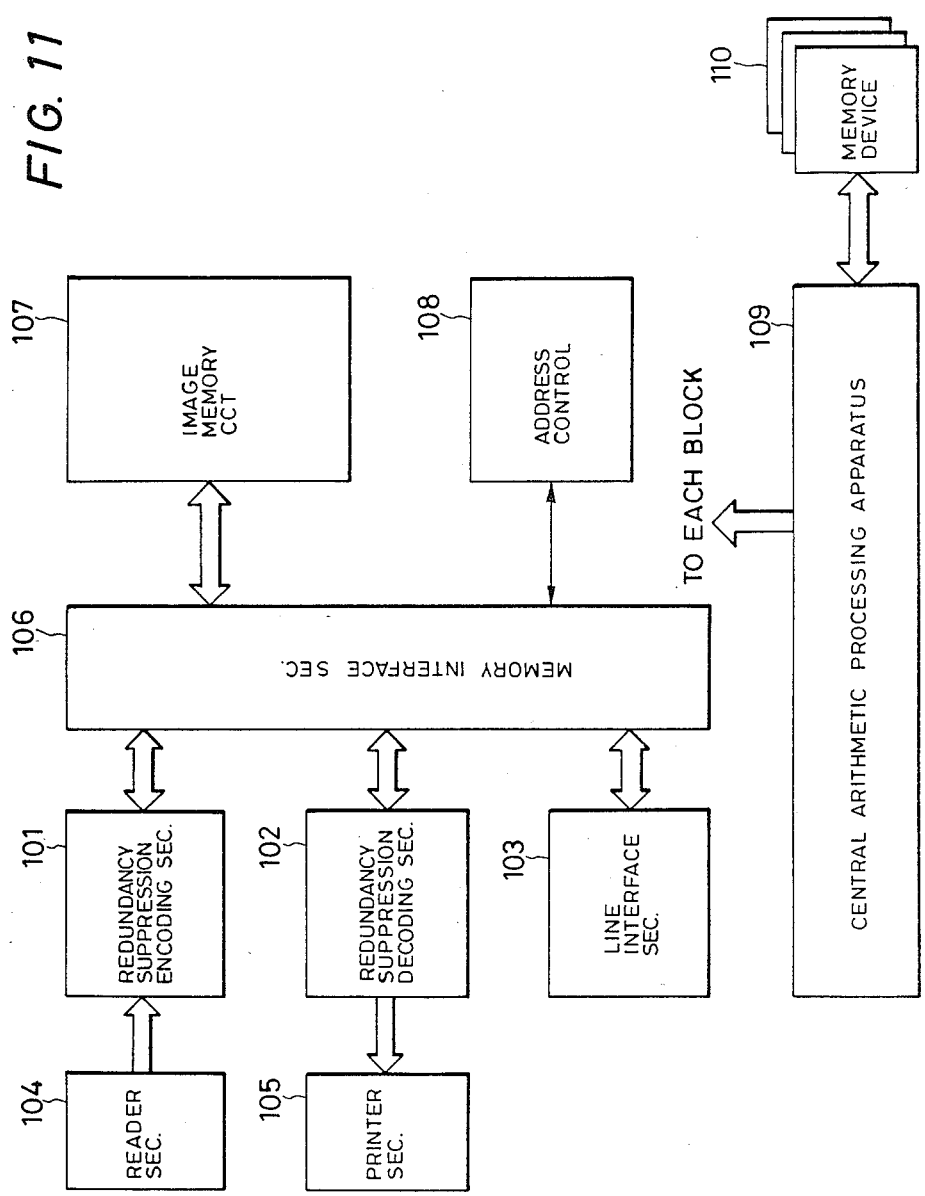
FIG. 11 is a block diagram schematically showing the function of a window memory.

FIG. 11 schematically shows the function of the window memory 15. In FIG. 11 there are shown a redundancy suppressing encoder 101 for image data encoding and a redundancy suppressing decoder 102 for decoding encoded image data, corresponding to the encoder/decoder 16 shown in FIG. 1; a line interface 103 for connecting a public line with the facsimile apparatus, corresponding to the line interfaces A18, B19 shown in FIG. 1; a scanner 104 for reading an original image with an image sensor such as CCD; a printer 105 for image recording according to image data; a memory interface 106; an address controller 108; a central processing unit 109 for controlling the blocks of the facsimile apparatus, corresponding to the CPU 1 in FIG. 1; a memory 110 for storing addresses, control information, etc., corresponding to the frame memory 14 in FIG. 1; and an image memory 107 for storing image memory, corresponding to the window memory 15 in FIG. 1. The image memory 107 is composed of a random access semiconductor memory, for storing image data obtained by encoding, in the redundancy suppressing encoder 101, the image data read from the scanner 104, or image data received from the line through the line interface 103, under the control of the address controller 108.

Figure 12:
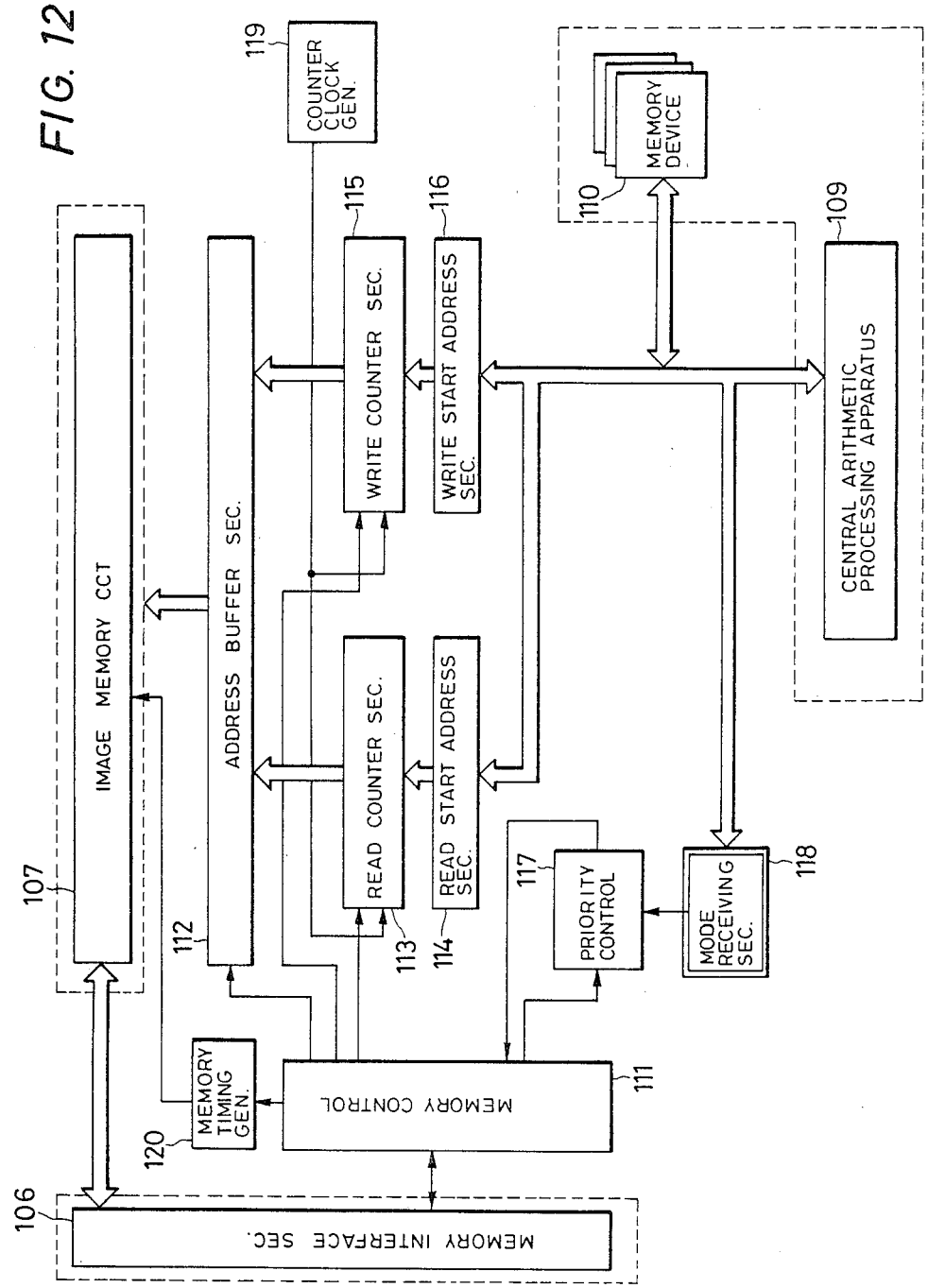
FIG. 12 is a block diagram showing the structure of an address control unit.

FIG. 12 is a block diagram of the address controller 108 shown in FIG. 11. In FIG. 12 there are shown a memory controller 111; an address buffer 112; a read counter 113; a read start address unit 114; a write counter 115; a write start address unit 116; a priority controller 117; a mode receiving unit 118; a counter clock signal generator 119; and a memory timing signal generator 120.

Following Table 1 shows an example of read/write operations executed by the priority controller 117.

In the following explanation, reference is made to FIG. 12.

At first, based on the address control information stored in the memory 110, the central processing unit (CPU) 109 sets a read start address and a write start address in the read start address unit 114 and the write start address unit 116. Also based on the mode information stored in the memory 110, the CPU 109 sets the mode of read/write operation and of priority in the mode receiving unit 118, which, in response, informs the priority controller 117 of said mode information.

If a write request is given, through the memory interface 106, from the scanner 104 for reading an original image, the memory controller 111 informs the priority controller 117 of said request. The priority controller 117 identifies an operation to be executed, according to Table 1 based on said information and the mode information from the mode receiving unit 118. If a write operation is identified to be executed, said identification is transmitted through the memory controller 111 to the write counter 115. Simultaneously the memory controller 111 sends a gate signal to the address buffer 112 for releasing an output address of the write counter 115. The content of the write counter 115 is renewed in succession, in synchronization with a clock signal from the counter clock generator 119, and the output address of said write counter 115 is supplied to the image memory 107 through the address buffer 112. Also the memory controller 111 requests the memory timing signal generator 120 to generate a timing signal, required for the write operation of the image memory 107. In response, the memory timing signal generator 120 sends said timing signal to the image memory 107.

The image data to be written are already sent, at this point, from the memory interface 106 to the image memory 107, and, after each writing operation, the memory controller 111 sends the next write request signal and a request signal for the next data sending, to the memory interface 106, which, in response, sends the next write request signal to the memory controller 111 and the next data to the image memory 107.

On the other hand, if a read request is given, through the memory interface 106, for the output to the printer 105, the memory controller 111 informs the priority controller 117 of said request, and the priority controller 117 identifies an operation to be executed, according to Table 1, based on said information and the mode information from the mode receiving unit 118. If a reading operation is identified to be executed, said identification is transmitted through the memory controller 111 to the read counter 113. Simultaneously the memory controller 111 sends a gate signal to the address buffer 112, for releasing an output address for the read counter 113.

Thus the content of the read counter 113 is renewed in succession, in synchronization with a clock signal from the counter clock signal generator 119. The output address of the read counter 113 is sent to the image memory 107 through the address buffer 112. Also the memory controller 111 request the memory timing signal generator 120 to generate a timing signal required for the reading operation of the image memory 107. In response the memory timing signal generator 120 sends said timing signal to the image memory 107. In response the image memory 107 sends the image data, read therefrom, to the memory interface 106, and the memory controller 111 sends a latch signal for said image data, to the memory interface 106. After each reading operation, the memory controller 111 requests the memory interface 106 to release a next read request signal, and, in response the memory interface 106 sends the next read request to the controller 111.

In the following there will be explained the function in a case where a write request and a read request are generated simultaneously in the course of the writing and reading operations explained above.

It is assumed that the mode receiving unit 118 already has a mode for simultaneous requests set by the CPU 109 according to the mode information of the memory 110, and has informed the priority controller 117 of said mode.

If the scanner starts a reading operation of the original image in the course of the image output by the printer 105 according to the image data received from the line and read from the image memory 107, two requests, for writing and reading, are sent from the memory interface 106 to the memory controller 111, which, in response, informs the priority controller 117 of this information.

The priority controller 117 identifies an operation of higher priority, based on Table 1, according to the mode set by the mode receiving unit 118. In a mode in which the writing request has a higher priority, as in the item 5, 18 or 26 in Table 1, the priority controller 117 informs the memory controller 111 that a writing operation is to be executed. In response the memory controller interrupts the reading operation by stopping the read counter 113, and activates the write counter 115 and the address buffer 112 to execute the writing operation. The function of the circuit blocks thereafter is the same as explained above.

In this manner the reading operation of the image memory 117 for the signal output to the printer 104 is interrupted, and the writing operation by original image reading is started. On the other hand, if a mode in which the reading request has a higher priority, such as the item 9, 13 or 22 in Table 1, is identified, the write request generated later is disregarded and the currently proceeding reading operation is continued. In this manner the read request is considered preferential, and the priority controller 117 informs the memory controller 111 that the reading operation is to be executed. The function of other circuit blocks is the same as explained before.

It is therefore rendered possible, in a case where write and read requests are generated simultaneously, to execute a desired request preferentially, by designating a preferential operation to the mode receiving unit 108.

The priority can be selected according to the object or status of use of the apparatus, so that the image processing can be efficiently achieved according to each apparatus.

Although the foregoing embodiment has been explained by reference to a facsimile apparatus, the present invention is applicable to various apparatus equipped with an image memory.

As explained in the foregoing, priority for the requests for writing image data into the image memory and reading image data therefrom is made variable, in order to ensure a flexibility in the image data processing.

TABLE 1

| | Example of read/write operation | | | | |
|---|---|---|---|---|---|
| | Mode | | 26 Request | | |
| | Priority | Read | Write | Read | Write | Operation |
| 1 | 0 | 0 | 0 | × | × | — |
| 2 | 0 | 0 | 1 | 0 | 0 | — |
| 3 | 0 | 0 | 1 | 0 | 1 | write |
| 4 | 0 | 0 | 1 | 1 | 0 | — |
| 5 | 0 | 0 | 1 | 1 | 1 | write |
| 6 | 0 | 1 | 0 | 0 | 0 | — |
| 7 | 0 | 1 | 0 | 0 | 1 | — |
| 8 | 0 | 1 | 0 | 1 | 0 | read |
| 9 | 0 | 1 | 0 | 1 | 1 | read |
| 10 | 0 | 1 | 1 | 0 | 0 | — |
| 11 | 0 | 1 | 1 | 0 | 1 | write |
| 12 | 0 | 1 | 1 | 1 | 0 | read |
| 13 | 0 | 1 | 1 | 1 | 1 | read |
| 14 | 1 | 0 | 0 | × | × | — |
| 15 | 1 | 0 | 1 | 0 | 0 | — |
| 16 | 1 | 0 | 1 | 0 | 1 | write |
| 17 | 1 | 0 | 1 | 1 | 0 | — |
| 18 | 1 | 0 | 1 | 1 | 1 | write |
| 19 | 1 | 1 | 0 | 0 | 0 | — |
| 20 | 1 | 1 | 0 | 0 | 1 | — |
| 21 | 1 | 1 | 0 | 1 | 0 | read |
| 22 | 1 | 1 | 0 | 1 | 1 | read |
| 23 | 1 | 1 | 1 | 0 | 0 | — |
| 24 | 1 | 1 | 1 | 0 | 1 | write |
| 25 | 1 | 1 | 1 | 1 | 0 | read |
| 26 | 1 | 1 | 1 | 1 | 1 | write |

×: don't care

Figure 13:
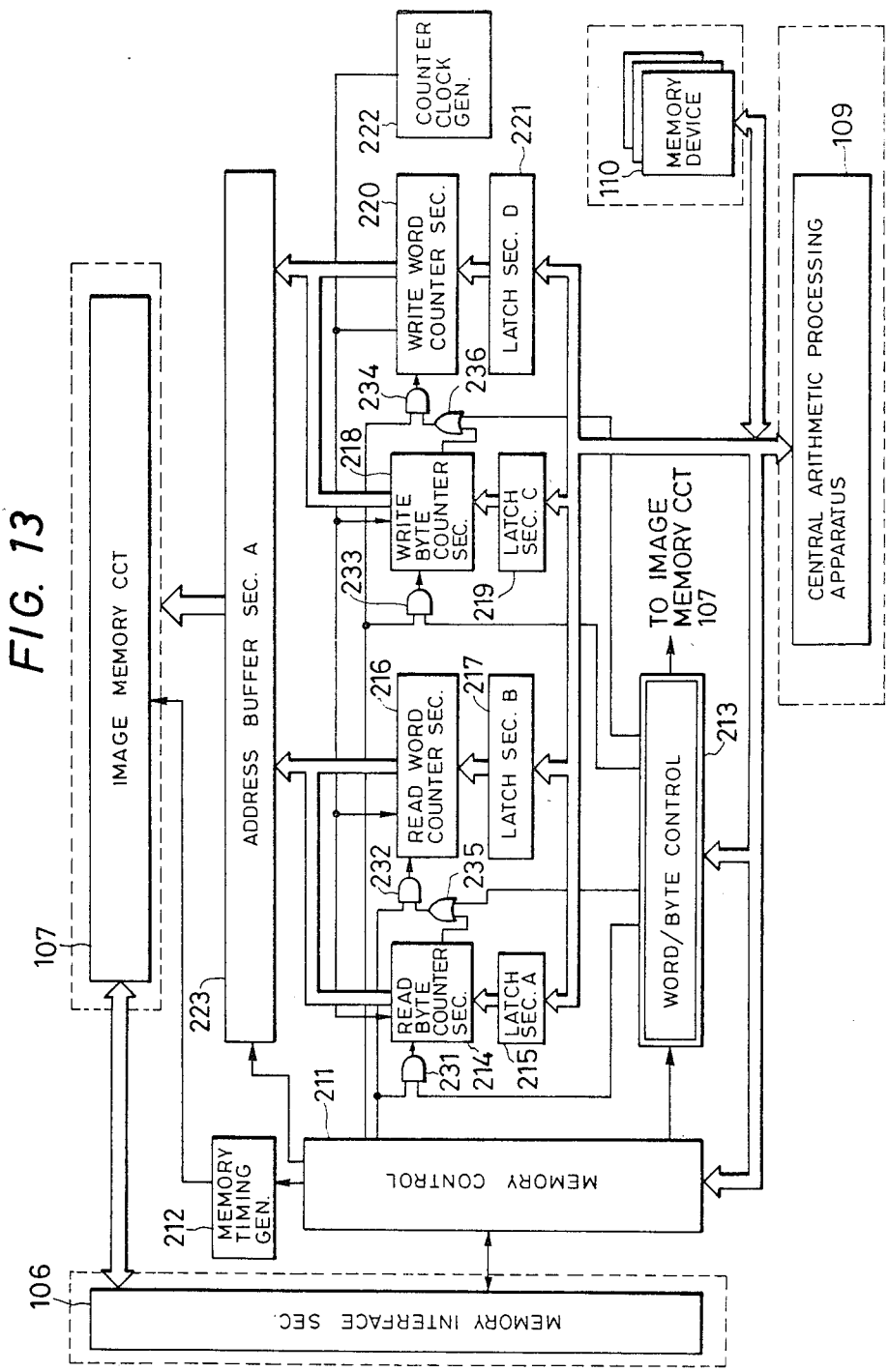
FIG. 13 is a block diagram showing another example of the address control unit.

FIG. 13 is a block diagram showing another example of the address controller 108 shown in FIG. 11. There are shown a memory controller 211; a memory timing signal generator 212; a word-byte controller 213; a read byte counter 214; a latch-A 215; a read word counter 216; a latch-B 217; a write byte counter 218; a latch-C 219; a write word counter 220; a latch D221; a counter clock generator 222; an address buffer-A 223; AND gates 231-234; and OR gates 235, 236.

Figure 14:
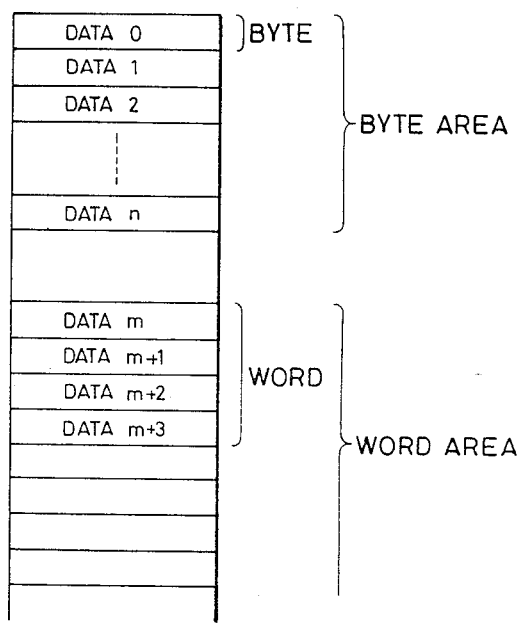
FIG. 14 is a view showing the data arrangement of an image memory space.

FIG. 14 shows an example of data arrangement in the memory space of the image memory 107.

In the following explanation reference is made to FIG. 13.

First, the central processing unit 109 designates the mode of writing or reading operation to the memory controller 211, according to the mode information stored in the memory 110. Also, it designates a word mode or a byte mode to the word-byte controller 213. In addition the central processing unit 109 sets a write start address and a read start address in the latch-A 215, -B 217, -C 219 and -D 221 according to the address information stored in the memory 110.

In a case of a write request supplied through the memory interface 106 in response, for example, to an original reading operation of the scanner 104, the memory controller 211 sends a start signal to the AND gates 233, 232, and instructs the address buffer A 223 to open a buffer gate for the write address. Also, the memory controller 211 sends word-byte information to the word-byte controller 213, in response to said write request.

In response to said information, the word-byte controller 213 sends, according to the already set word-/byte mode, word/byte information either to the OR gate 236 in the case of the word mode or to the AND gate 233 in the case of the byte mode. Said mode information is also sent to the image memory 107.

In a case of a write operation in the byte mode on the signal received from the line through the line interface 103, a start signal is supplied from the AND gate 233 to the write byte counter 218. The count of the write byte counter 218 is renewed in succession in synchronization with the clock signal from the counter clock generator 222, and a carry-over signal thereof is supplied through the OR gate 236 and the AND gate 234 to advance the count of the write word counter 220. Also, in the case of a write operation in the word mode on the signal obtained by an original reading operation of the scanner 104, the count of the write word counter alone is renewed in succession through the OR gate 236 and the AND gate 234, in synchronization with the clock signal from the counter clock generator 222.

The outputs of the write byte counter 218 and the write word counter 220 are supplied to the address buffer 223. At the same time the memory controller 211 requests the memory timing signal generator 220 to generate a timing signal required for the writing operation into the memory, and, in response, the memory timing signal generator 220 sends the timing signal to the image memory 107.

In this state the image data are already sent from the memory interface 106 to the image memory 107, and, after each writing operation, the memory controller 211 sends, to the memory interface 106, requests for a write request signal and for the next image data. In response the memory interface 106 sends the next write request signal to the memory controller 211 and the next data to the image memory 107, thereby executing a write operation in response to the release said write address.

In the foregoing there has been explained the function in the case of a write request from the memory interface 106, but the function is similar in case of a read request for example for the signal supply to the printer 105. More specifically, in such case, the memory controller 211 sends a start signal to the AND gates 231, 232 and instructs the address buffer-A 223 to open the buffer gate for releasing the read address. Also, the memory controller 211 sends, to the word-byte controller 213, word-byte information responding to the read request. In response to said information, the word-byte controller 213 sends the word/byte mode information, according to the already set word/byte mode, either to the OR gate 235 in the case of the word mode or to the AND gate 231 in the case of the byte mode.

In this case of a reading operation in the byte mode for signal transmission to the line, a start signal is supplied from the AND gate 231 to the read byte counter 214. Thus the count of the read byte counter 214 is renewed in succession in synchronization with the clock signal from the counter clock generator 222, and a carry-over signal thereof is supplied through the OR gate 235 and the AND gate 232 to advance the read word counter 216.

On the other hand, in the case of a reading operation in the word mode for the signal supply to the printer 105, the count of the read word counter 216 alone is renewed in succession through the OR gate 235 and the AND gate 232, in synchronization with the clock signal from the counter clock generator 222. The output address of the read counter 216 is supplied to the address buffer A 223. In this state the memory controller 211 requests the memory timing signal generator 212 to generate a timing signal required for the execution of the reading operation of the memory, and, in response, the memory timing signal generator 212 sends the timing signal to the image memory 107. Thus the image memory sends the data read therefrom to the memory interface 106, and the memory controller 211 sends a latch signal for said read data to the memory interface 106.

After each reading operation, the memory controller 211 requests the memory interface 106 to release the next read request signal, and, in response to said request, the memory interface 106 send the next read request signal to the memory controller 211, whereby the reading operation is executed in response to the release of the read address mentioned above.

Figure 15:
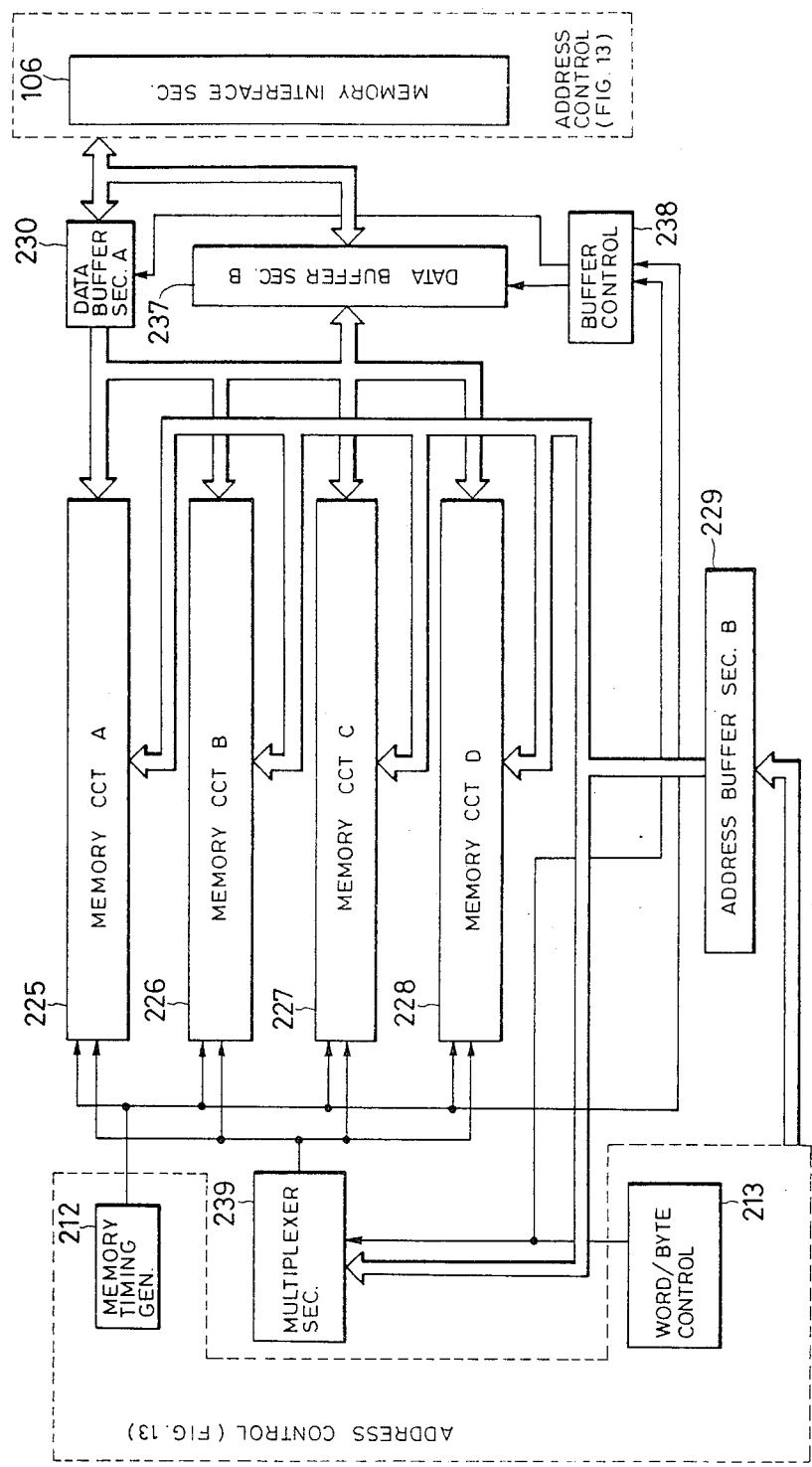
FIG. 15 is a block diagram of an image memory circuit.

FIG. 15 is a block diagram showing an example of the image memory 107, wherein are shown memory circuits A-D 225-228; an address buffer-B 229; a data buffer-A 230; a data buffer-B 237; a buffer controller 238; and a multiplexer 239.

In the following the circuit shown in FIG. 15 will be explained.

An address signal supplied from the address controller (FIG. 13) is supplied, through the address buffer-B 229, to the memory circuits A-D (225-228). Also a part of said address signal is supplied to the multiplexer 239.

The word/byte mode information from the word-byte controller 213 in the address controller (FIG. 13) is supplied to the buffer controller 238 and the multiplexer 239. The multiplexer 239 determines a memory block (memory circuit A-D) for execution, based on the address signal from the address buffer B 229 and the word-/byte mode information. Then an access for writing operation into the memory or for reading operation from the memory is made by receiving, by means of the memory circuits 225-228, the timing signal from the memory timing signal generator 212 in the address controller (FIG. 13).

The buffer controller 238 controls the buffer gates of the data buffer-A 230 and the data buffer-B 237, in response to the word/byte mode information from the word-byte controller 213 in the address controller (FIG. 13) and to the read/write signal from the memory timing signal generator 212. In the case of the byte mode, the buffer gate of the data buffer-A 230 is controlled according to the read/write operation, and, in the case of the word mode, the buffer gate of the data buffer-B 237 is controlled according to the read/write operation.

Thus the access to the memory circuits A-D (225-228) is made, and the data exchange with the memory interface 106 is conducted through the data buffer-A 230 and the data buffer-B 237.

As explained in the foregoing, it is rendered possible to easily execute data writing into the image memory or data reading therefrom in the unit of a word or a byte, and thus to sufficiently respond to the request of data unit from the output side or from the input side.

Though the foregoing embodiments have been explained in terms of a facsimile apparatus, the present invention is applicable also to various apparatus equipped with an image memory.

As explained in the foregoing, in a case of plural requests of data writing or reading to the image memory, the operation in units of a word or a byte can be easily achieved without complex additional circuits.

Though the foregoing description has been limited to the preferred embodiments, the present invention is not limited to such embodiments but is subject to various modifications and variations within the scope and spirit of the appended claims.

What is claimed is:

1. An image data encoding apparatus comprising:
    memory means for storing a page of image data to be encoded;
    encoding means for encoding the image data read out from said memory means;
    transfer means for DMA transfer of the image data from said memory means to said encoding means, said transfer means being operable to intermittently DMA-transfer a page of image data in increments of a predetermined amount; and
    control means for causing said encoding means to intermittently perform encoding of the image data in synchronization with the intermittent DMA transfer of the image data by said transfer means.

2. An image data encoding apparatus according to claim 1, wherein said transfer means is adapted to DMA transfer in parallel the predetermined amount of the image data.

3. An image data encoding apparatus according to claim 2, wherein said encoding means comprises converter means for converting the image data which are DMA-transferred in parallel into serial image data.

4. An image data encoding apparatus according to claim 1, wherein said encoding means comprises storage means for temporarily storing the predetermined amount of image data DMA transferred by said transfer means.

5. An image data encoding apparatus according to claim 1, wherein said encoding means performs an encoding operation during a period of time when a reference signal is supplied, and interrupts the encoding operation in response to a cessation of the reference signal.

6. An image data encoding apparatus according to claim 5, wherein said control means further comprises supply means for supplying the reference signal to said encoding means in synchronism with the intermittent DMA transfer of the image data by said transfer means.

7. An image code decoding apparatus comprising:
    decoding means for decoding an image code and generating image data;
    memory means for storing image data generated by said decoding means;
    transfer means for DMA transfer of the image data from said decoding means to said memory means, said transfer means being operable to intermittently DMA-transfer a page of image data in increments of a predetermined amount; and control means for causing said decoding means to intermittently perform decoding of the image code in synchronization with the intermittent DMA transfer of the image data by said transfer means.

8. An image code decoding apparatus according the claim 7, wherein said transfer means is adapted to DMA transfer, in parallel, the predetermined amount of the image data.

9. An image code decoding apparatus according to claim 8, wherein said decoding means comprises converter means for converting serial image data into parallel image data to be DMA transferred.

10. An image code decoding apparatus according to claim 7, wherein said decoding means comprises storage means for temporarily storing the predetermined amount of image data to be DMA transferred by said transfer means.

11. An image data decoding apparatus according to claim 7, wherein said decoding means performs a decoding operation during a period of time when a reference signal is supplied, and interrupts the decoding operation in response to cessation of the reference signal.

12. An image data decoding apparatus according to claim 11, wherein said control means has supply means for supplying the reference signal to said decoding means in synchronism with the intermittent DMA transfer of the image data by said means.

* * * * *

UNITED STATES PATENT AND TRADEMARK OFFICE
CERTIFICATE OF CORRECTION

PATENT NO. : 4,887,224
DATED : December 12, 1989
INVENTOR(S) : TATSUO OKANO, ET AL.

Page 1 of 2

It is certified that error appears in the above-identified patent and that said Letters Patent is hereby corrected as shown below:

On the title page:

IN [56] REFERENCES CITED

U.S. PATENT DOCUMENTS, "Wajcik et al." should read --Wojcik et al.--.

COLUMN 1

Line 20, "Read" (both occurrences) should read --READ--.

COLUMN 3

Line 44, "transfer" should read --transfers--.

COLUMN 4

Line 51, "transfer" should read --transfers--.

COLUMN 7

Line 67, "are" should be deleted.

COLUMN 8

Line 40, "of" (first occurrence) should read --at--.
    Line 66, "and" should be deleted.

COLUMN 12

Line 17, "request" should read --requests--.

UNITED STATES PATENT AND TRADEMARK OFFICE
CERTIFICATE OF CORRECTION

PATENT NO. : 4,887,224
DATED : December 12, 1989
INVENTOR(S) : TATSUO OKANO, ET AL.

It is certified that error appears in the above-identified patent and that said Letters Patent is hereby corrected as shown below:

COLUMN 13

TABLE 1, "26 Request" should read --Request--.

COLUMN 14

Line 49, "said" should read --of said--.
    Line 65, "this" should read --the--.

COLUMN 15

Line 26, "send" should read --sends--.

COLUMN 17

Line 5, "the" should read --to--.

Signed and Sealed this

Twenty-third Day of April, 1991

*Attest:*

HARRY F. MANBECK, JR.

*Attesting Officer*     Commissioner of Patents and Trademarks